A. E. YOUNG.
Attaching Shank to Door-Knobs.
No. 196,852.  Patented Nov. 6, 1877.
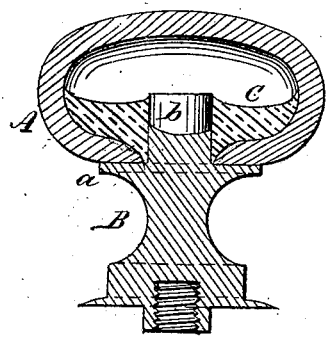
WITNESSES:
INVENTOR:
A. E. Young
BY
ATTORNEYS.

UNITED STATES PATENT OFFICE.

ALONZO E. YOUNG, OF BOSTON, MASSACHUSETTS.

IMPROVEMENT IN ATTACHING SHANKS TO DOOR-KNOBS.

Specification forming part of Letters Patent No. 196,852, dated November 6, 1877; application filed September 10, 1877.

*To all whom it may concern:*

Be it known that I, ALONZO E. YOUNG, of Boston, in the county of Suffolk and State of Massachusetts, have invented a new and Improved Method of Attaching Shanks to Door-Knobs, of which the following is a specification:

My invention relates to an improved method of attaching shanks to hollow knobs; and it consists in pouring into the knob a quantity of melted cement sufficient to partly fill the knob, inserting the shank or socket, and inverting it to permit the cement to settle around the shank.

The common method of fastening the shanks to the knobs consists in filling the cavity of the knob with cement and pressing the shank or socket into the cement while it is still plastic. When exposed to the heat of the sun the expansion of the cement thrusts the socket from the knob, rendering it imperfect and useless. To obviate this difficulty is the object of my invention.

In carrying out my invention I take an ordinary hollow glass knob and partly fill it with cement, and insert into it a notched or roughened shank. I then invert the knob while the cement is still hot, and permit it to settle around the shank and harden.

In the drawing, which is a diametrical section of a knob made on my improved plan, A is the hollow glass knob; B, the shank, having a flange or collar, $a$, which fits the back of the knob around the opening. The end $b$ of the shank that projects into the knob is notched or roughened, to insure a firm hold of the cement upon it. C represents the cement.

The cement I prefer to use is composed of equal parts of calcined plaster and rosin, heated separately, and put together and thoroughly stirred. This cement settles compactly together, and adheres strongly to glass, metal, and wood. Any other cement having similar qualities may be used.

My improved method of fastening is applicable to knobs of glass, metal, wood, and other materials.

Having thus described my invention, I claim as new and desire to secure by Letters Patent—

The method herein described of attaching the socket or shank to a hollow knob, consisting in partly filling the knob with cement and inverting the same, so that the cement may settle and harden around the shank, and thus leave an open space for the expansion of the cement, substantially as and for the purpose set forth.

ALONZO E. YOUNG.

Witnesses:
JAS. B. BELL,
HIRAM SHEPARDSON.